United States Patent [19]

Muller

[11] Patent Number: 4,586,244
[45] Date of Patent: May 6, 1986

[54] METHOD AND APPARATUS FOR ASSEMBLING A ROTATABLE MACHINE AND A METHOD FOR OPERATING THE APPARATUS

[75] Inventor: Alexander Muller, Holland, Mich.

[73] Assignee: General Electric Company, Fort Wayne, Ind.

[21] Appl. No.: 616,200

[22] Filed: Jun. 1, 1984

Related U.S. Application Data

[63] Continuation-in-part of Ser. No. 593,840, Mar. 27, 1984.

[51] Int. Cl.⁴ ............................................. H02K 15/02
[52] U.S. Cl. ....................................... 29/598; 29/732; 29/744
[58] Field of Search ................... 29/598, 732, 744; 310/42, 46, 156, 152, 218, 262, 271

[56] References Cited

U.S. PATENT DOCUMENTS

| | | | |
|---|---|---|---|
| 3,221,194 | 11/1965 | Blackburn | 310/156 |
| 3,531,670 | 9/1970 | Loudon | 310/156 |
| 4,059,898 | 11/1977 | Adair | 29/598 |
| 4,316,605 | 2/1982 | Zachry et al. | 29/744 |
| 4,351,103 | 9/1982 | Rodenbeck | 29/732 |
| 4,427,911 | 1/1984 | Manson | 310/156 |
| 4,443,934 | 4/1984 | Hickey | 29/732 |
| 4,449,289 | 5/1984 | Kindig | 29/732 |

FOREIGN PATENT DOCUMENTS

19369  2/1981  Japan .................. 310/152

Primary Examiner—Mark Rosenbaum
Assistant Examiner—P. W. Echols
Attorney, Agent, or Firm—Joseph E. Papin

[57] ABSTRACT

A method of operating apparatus for assembling a rotatable assembly adapted for use in a dynamoelectric machine. In this method, a set of cams are drivingly engaged with a set of cam followers on a set of holders for a set of magnet material elements to move the holders toward assembly positions spacing the inner arcuate surfaces of the magnet material elements within a preselected spatial range from a circumferential surface of at least one rotatable member of the rotatable assembly with the at least one rotatable assembly being arranged in a preselected located position in the apparatus. Apparatus is also disclosed.

28 Claims, 20 Drawing Figures

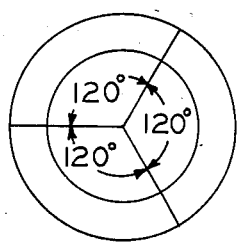
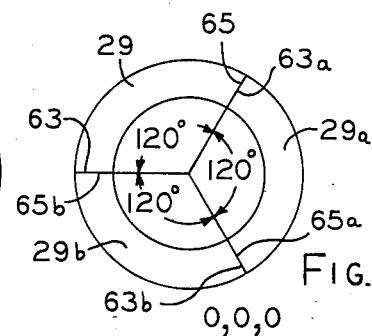
FIG. 13A PRIOR ART
FIG. 14A
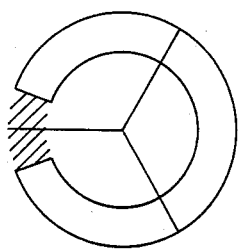
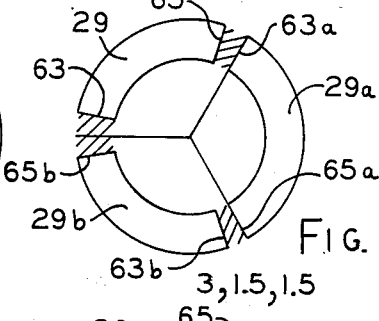
FIG. 13B PRIOR ART
FIG. 14B
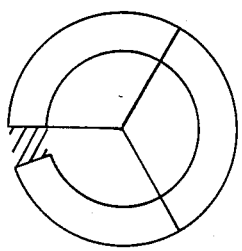
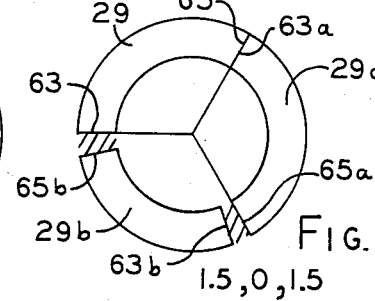
FIG. 13C PRIOR ART
FIG. 14C
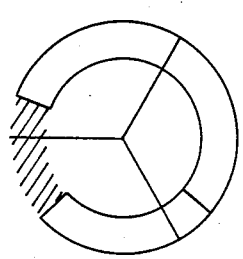
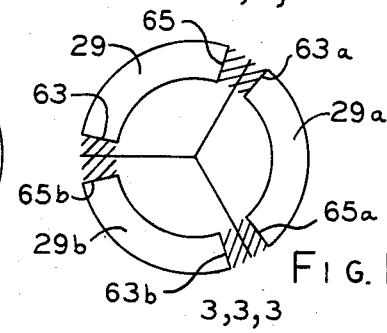
FIG. 13D PRIOR ART
FIG. 14D

METHOD AND APPARATUS FOR ASSEMBLING A ROTATABLE MACHINE AND A METHOD FOR OPERATING THE APPARATUS

CROSS-REFERENCE TO RELATED APPLICATION

This application is a continuation-in-part of the commonly assigned application Ser. No. 593,840 filed Mar. 27, 1984 which is incorporated by reference herein.

FIELD OF THE INVENTION

This invention relates in general to dynamoelectric machines and in particular to improved apparatus for assembling a rotatable assembly and an improved method of operating such apparatus.

BACKGROUND OF THE INVENTION

In the past, various different methods have been utilized to secure arcuate shaped magnet material elements formed of a frangible material to a circumferential surface of a rotor core. In one of these past methods, the rotor core was provided with protrusions which were associated in displacement preventing engagement with the arcuate magnet material elements thereby to maintain them in place seated against the circumferential surface of the rotor core. In another of the past methods, a fiber, plastic or metallic wrap or sleeve was provided enveloping at least the arcuate outer surfaces of the magnet material elements thereby to maintain the magnet material elements against displacement from their seated engagement with the circumferential surface of the rotor core.

In still another of the aforementioned past methods of securing arcuate magnet material elements to a rotor core, a hardenable adhesive material was applied to at least one of the circumferential surface of the rotor core and the arcuate inner surfaces of the magnet material elements. After such application of the hardenable adhesive material, the arcuate inner surfaces of the magnet material elements were seated or abutted against the circumferential surface of the rotor core, and in this position, the permanent magnet material elements and the circumferential surface of the rotor core were merely clamped together until the hardenable adhesive material set or hardened thereby to adhere together the magnet material elements and the circumferential surface of the rotor core. Since both the arcuate inner surfaces of the magnet material elements and the circumferential surface of the rotor core may have high points or areas due to tolerance variations during the manufacture thereof, it is believed that the arcuate inner surfaces of magnet material elements and the circumferential surface rotor core were at least in part in surface-to-surface engagement with each other. Due at least in part to such aforementioned surface-to-surface engagement, it is believed that one of the disadvantageous or undesirable features of this past method was that some of the frangible arcuate magnet material elements may have fractured or cracked when pressure or force was applied thereto to clamp them against the rotor core. Since the high points or areas on the arcuate inner surfaces of the magnet material elements and the circumferential surface of the rotor core effected by the aforementioned tolerance variations were clamped directly into the aforementioned surface-to-surface engagement, another disadvantageous or undesirable features of this past method is believed to be that dependable uniform bond strengths of the hardenable adhesive material could not be attained between the arcuate inner surfaces of the magnet material elements and the circumferential surface of the rotor core. Due to this nonuniformity of bond strength, it is also believed that the rotor assemblies fabricated by this past method may have been acceptable for use in low speed motor applications, such as ceiling fans for instance, but might not have been unacceptable in relatively high speed motor applications, such as clothes washers and various hermetic motor applications for instance. Additionally, it is further believed that another disadvantageous or undesirable feature of rotatable assemblies fabricated by the past method was that the outside diameter or circumference thereof was not constant since the radial distance between the circumferential surface of the rotor core and the arcuate outer surface of each permanent magnet material element may have varied due to the aforementioned tolerance buildup therebetween. While the prior art rotatable assemblies believed to have the above discussed disadvantageous feature may have been acceptable for some relatively low speed motor applications, it is believed that they may be too far out of balance for use in a motor application of relatively high speeds, say for instance, at least about nine thousand revolutions per minute (9000 rpm) or above. Also with respect to the prior art rotatable assemblies believed to have the above discussed disadvantageous feature, it is believed that a flux gap between a stator bore and the aforementioned non-coaxial outer arcuate surfaces of the permanent magnet material elements on such prior art rotatable assemblies may have been deleteriously affected. Furthermore, it is also believed that another disadvantageous or undesirable feature of rotatable assemblies manufactured by this past method was that the arc lengths of the permanent magnet material elements may not have been evenly distributed about the circumferential surface of the rotor core thereby also to effect a too far out of balance rotatable assembly for use in the aforementioned higher speed motor applications.

SUMMARY OF THE INVENTION

Among the several objects of the present invention may be noted the provision of an improved apparatus for assembling a rotatable assembly and an improved method of operating such apparatus which overcomes the above discussed disadvantageous or undesirable features, as well as others, of the prior art; the provision of such improved apparatus and method in which camming means is selectively actuated to effect cam driven movement of a set of means for receiving the magnet material elements toward assembly positions with respect to at least one rotatable member of the rotatable assembly disposed in a preselected located position in the apparatus, respectively; the provision of such improved apparatus and method in which the camming means defines at least in part not only the assembly positions but also at-rest positions of the receiving means, respectively; the provision of such improved apparatus and method in which the magnet material elements are magnetically retained on the receiving means therefor, respectively; the provision of such improved apparatus and method in which a set of means is associated with the magnet material elements for adjusting them into preselected positions therefor on the receiving means upon the movement of the receiving means toward the assembly positions thereof and with the adjusting means being actuated to a displaced position with respect to the receiving means subsequent to the adjustment of the magnet material elements into their preselected positions, respectively; the provision of such improved apparatus and method in which the arcuate lengths of the magnet material elements are more evenly distributed about the circumferential surface of the at least one rotatable member, respectively; and the provision of such improved apparatus and method in which the components utilized are simple in design, easily assembled and economically manufactured. These as well as other objects and advantageous features of the present invention wil be in part apparent and in part pointed out hereinafter.

In general, apparatus is provided in one form of the invention for assembling a rotatable assembly adapted for use in a dynamoelectric machine. The rotatable assembly includes at least one rotatable member having a circumferential surface, a set of magnet material elements having generally arcuate inner and outer surfaces, and a hardenable adhesive material disposed on at least one of the arcuate inner surfaces of the magnet material elements and the circumferential surface of the at least one rotatable member, respectively. The apparatus comprises means for disposing the at least one rotatable member in a preselected position and a set of means movable toward assembly positions with respect to the at least one rotatable member in the preselected position thereof and adapted for receiving the magnet material elements in preselected positions thereon with the arcuate inner surfaces of the magnet material elements arranged generally in facing relation with the circumferential surface of the at least one rotatable member, respectively. Means is operable generally for camming said receiving means toward their assembly positions so as to space the arcuate inner surfaces of the magnet material elements within a preselected spatial range from the circumferential surface of the at least one rotatable member in the peselected position thereof with the hardenable adhesive material at least filling the space established between the arcuate inner surfaces of the magnet material elements and the circumferential surface of the at least one rotatable member, respectively.

Also in general and in one form of the invention, a method is provided for operating apparatus for assembling a rotatable assembly adapted for use in a dynamoelectric machine. The rotatable assembly includes at least one rotatable member having a circumferential surface, and a set of magnet material elements having generally arcuate inner and outer surfaces, respectively. The apparatus includes a set of means adapted for receiving the magnet material elements, a set of cam followers associated with the receiving means and camming means adapted for selective actuation and having a set of cams thereon, respectively. In practicing this method, the at least one rotatable member is placed in a preselected position in the apparatus with respect to the receiving means, respectively. The magnet material elements are received in the receiving means, and the magnet material elements are adjusted into preselected positions therefor on the receiving means, respectively. The selective actuation of the camming means is effected, and the cams thereof are drivingly engaged with the cam followers of the receiving means, respectively. The receiving means are cammed generally conjointly into assembly positions therefor with respect to the at least one rotatable member in its preselected position, and the arcuate inner surfaces of the magnet material elements in the preselected positions thereof on the receiving means are spaced within a preselected spatial range from the circumferential surface of the at least one rotatable member upon the camming of the receiving means into the assembly positions thereof, respectively.

BRIEF DESCRIPTION OF THE DRAWINGS

FIGS. 13A–13D and 14A–14D are respectively schematic representations illustrating the spacing of gaps which may occur due to tolerance variations in the arcuate length of the magnet material elements when the magnet material elements are predeterminately located with respect to the rotor core in the present invention as compared with such gaps which may occur in the prior art assembly of magnet material elements to a rotor core without such predetermined location.

Corresponding reference characters indicate corresponding parts throughout the several views of the drawings.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
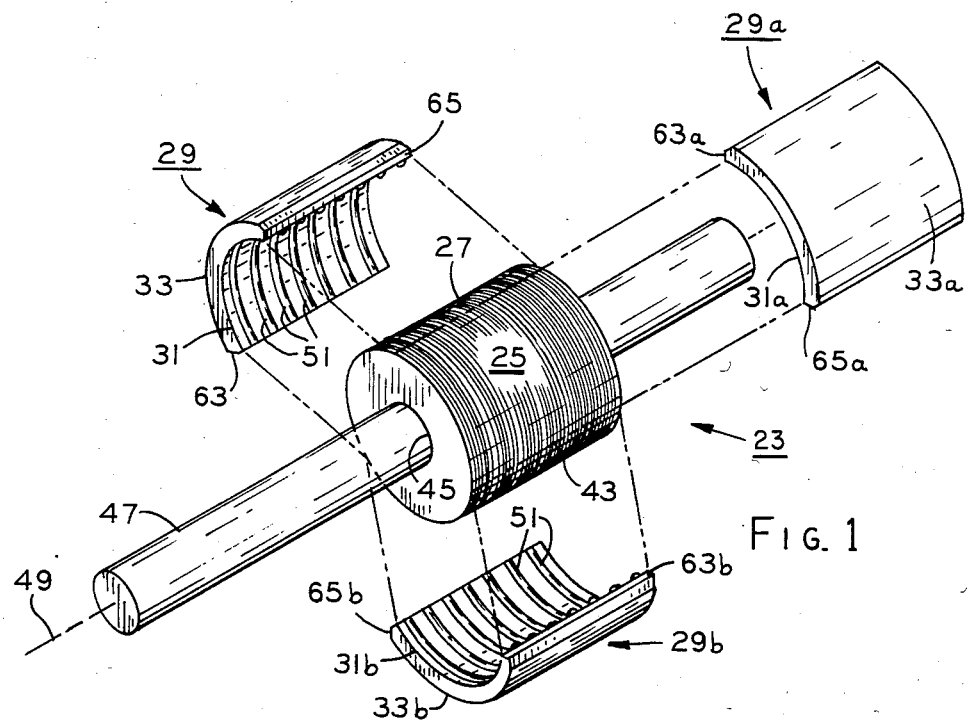
FIG. 1 is an exploded isometric view of a rotatable assembly adapted for use in a dynamoelectric machine.
Figure 3:
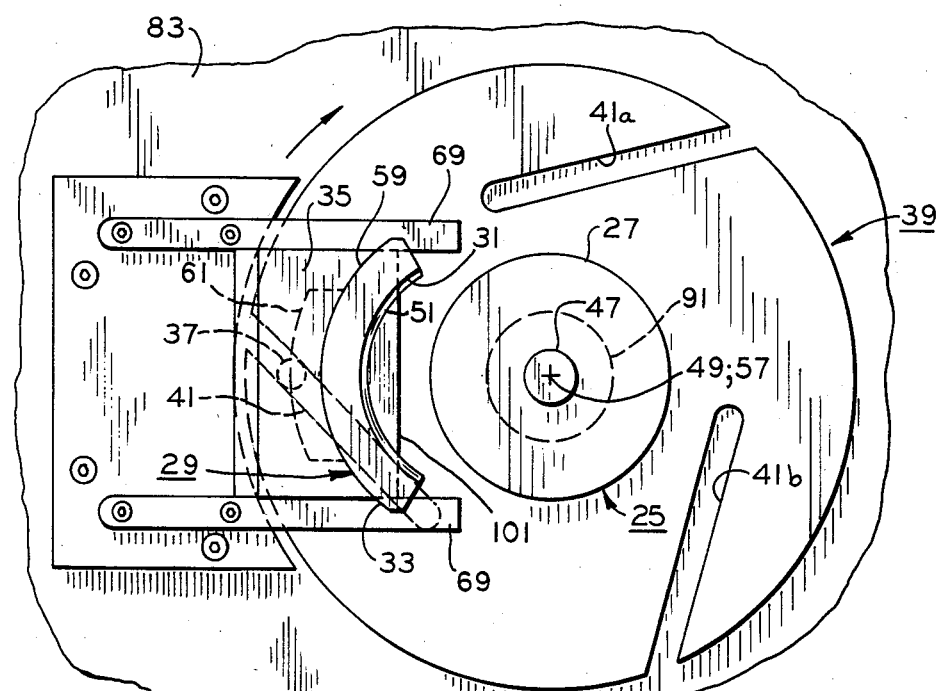
FIG. 3 is a partial plan view taken from FIG. 2 illustrating only one of the receiving means for one of the magnet material elements in an at-rest position thereof.
Figure 2:
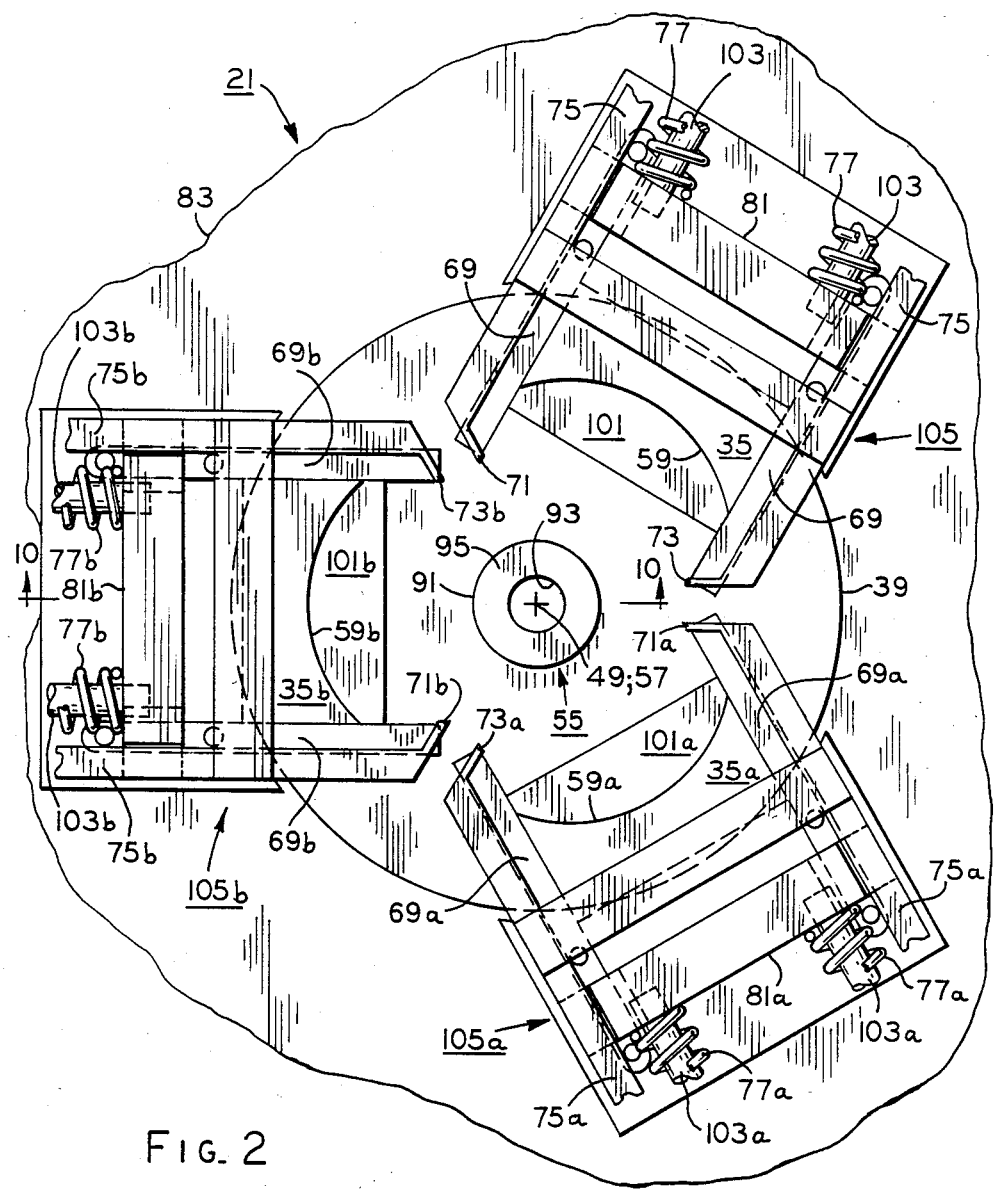
FIG. 2 is a plan view showing apparatus in one form of the invention for assembling the rotatable assembly in FIG. 1 and including a retractable clamp for adjustably effecting the disposition of a magnet material element in a preselected position therefor on means for receiving it and also illustrating principles which may be practiced in a method for operating such apparatus in one form of the invention.
Figure 4:
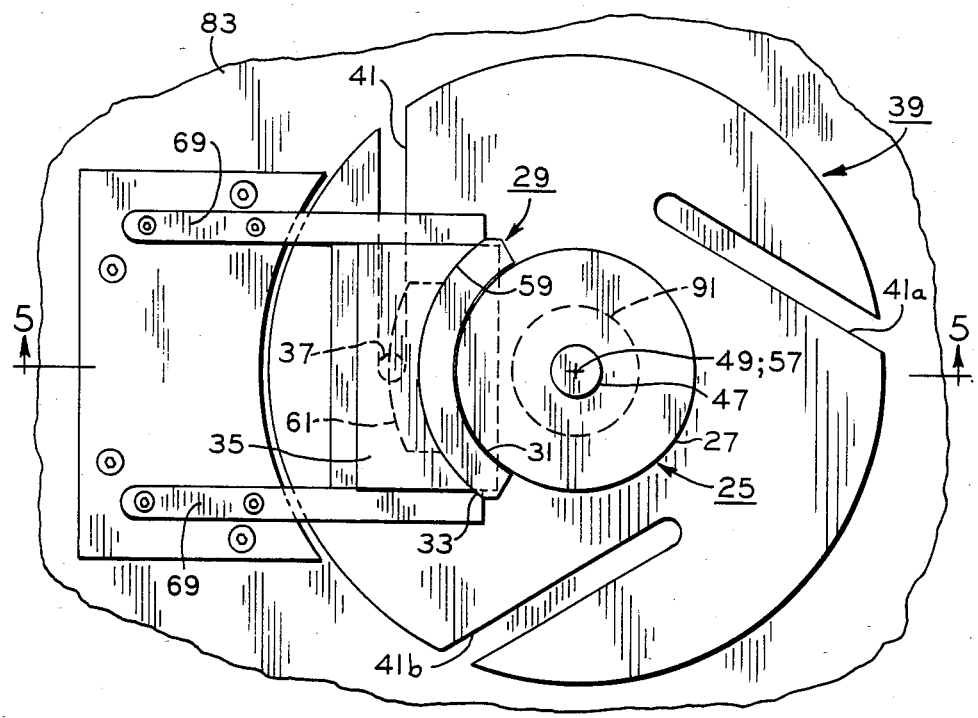
FIG. 4 is generally the same as FIG. 3 but showing the receiving means advanced to the assembly or advanced position thereof.
Figure 5:
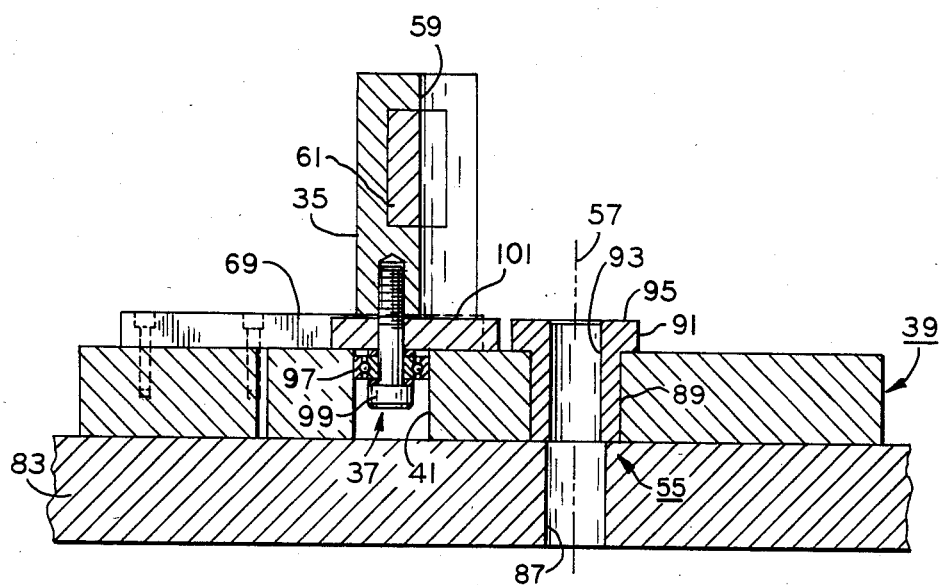
FIG. 5 is a partial sectional view taken along line 5—5 in FIG. 4.
Figure 8:
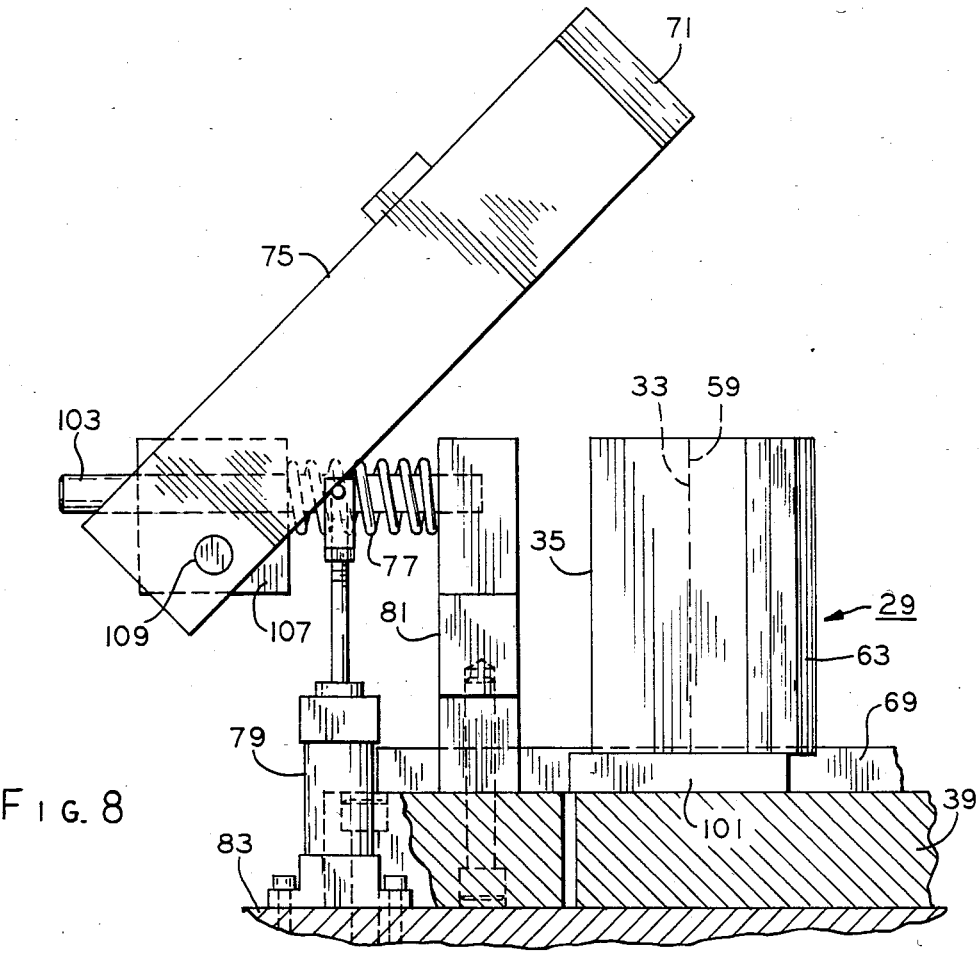
FIG. 8 is generally the same as FIG. 7 but showing the retractable clamp actuated to its pivotally displaced or retracted position.
Figure 9:
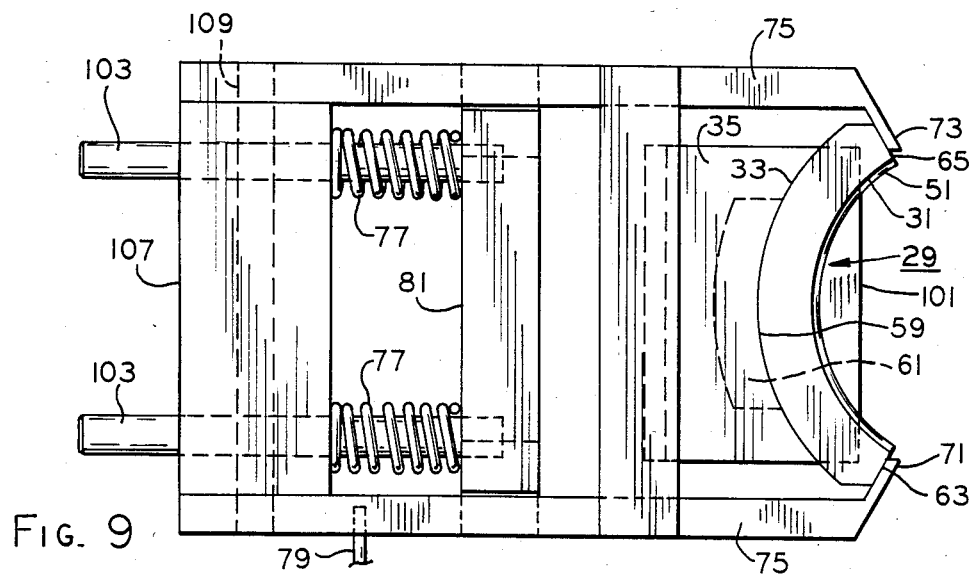
FIG. 9 is a partial plan view taken from FIG. 6 and illustrating the retractable clamp conjointly advanced with the receiving means toward intermediate positions thereof, respectively.
Figure 10:
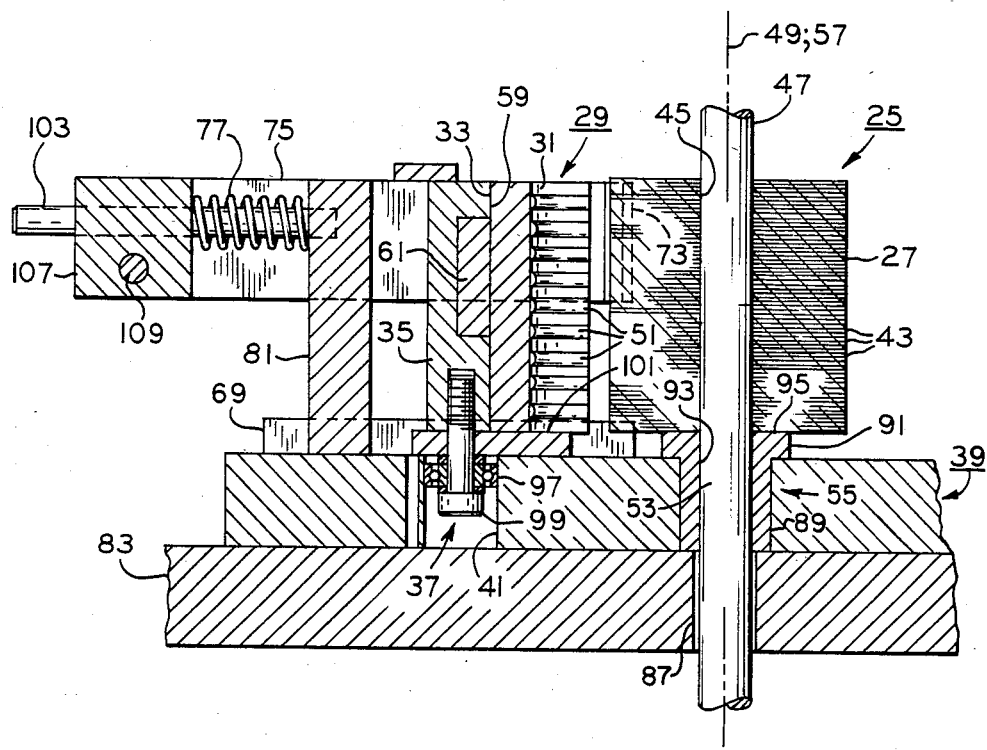
FIG. 10 is an enlarged sectional view taken along line 10—10 in FIG. 2 and additionally illustrating a rotor core and shaft mounted in the apparatus.
Figure 11:
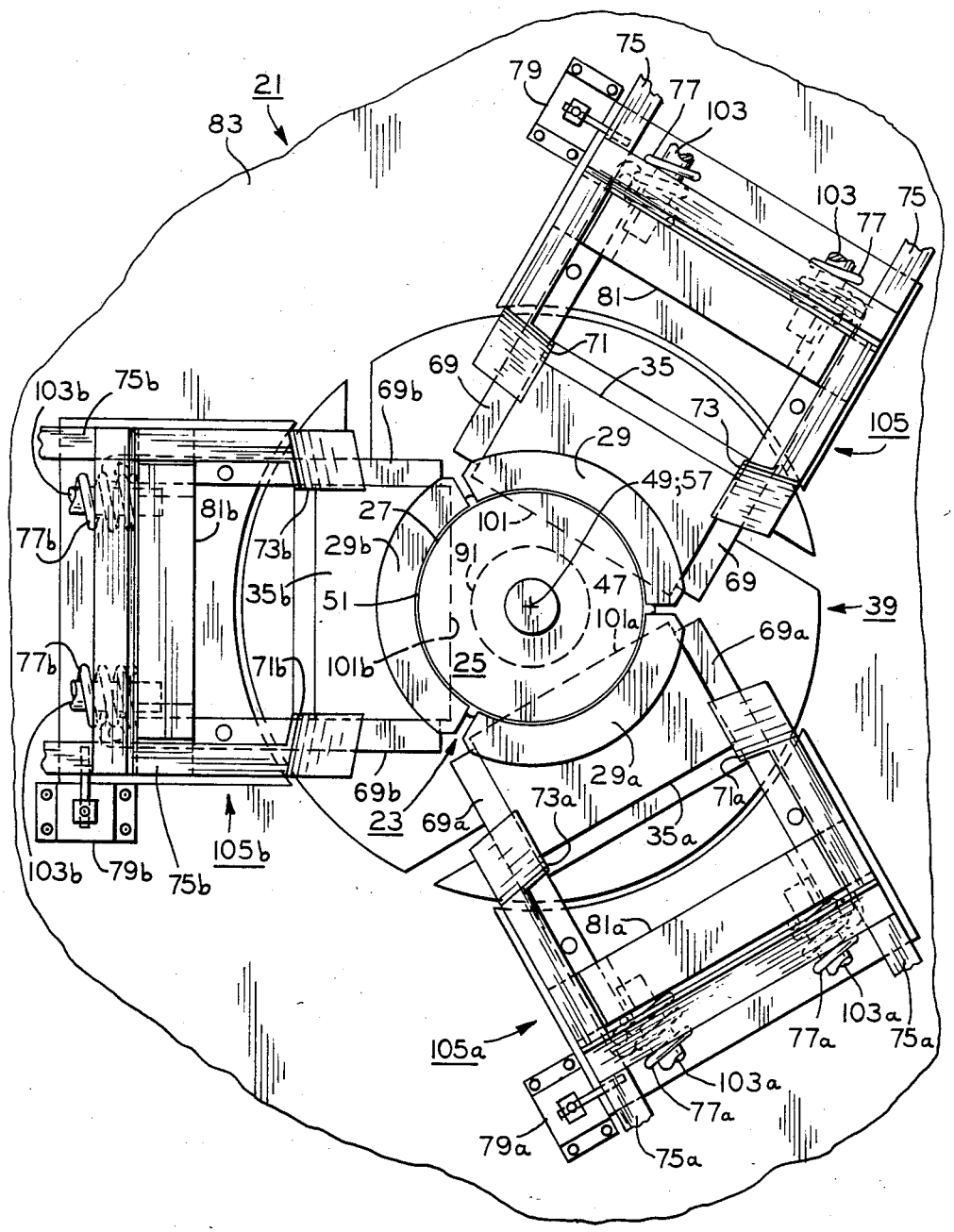
FIG. 11 is generally the same as FIG. 2 but showing the apparatus actuated to illustrate arcuate inner surfaces of the magnet material elements spaced within a preselected spatial range from a circumferential surface of the rotor core defining a part of the rotatable assembly and with a hardenable adhesive material filling the spaces established therebetween.

Referring now to the drawings in general, there is illustrated in one form of the invention a method of operating apparatus 21 for assembling a rotatable assembly 23 adapted for use in a dynamoelectric machine (now shown) (FIGS. 1-12). Rotatable assembly 23 includes at least one rotatable member, such as a rotor core 25 or the like for instance, having a circumferential surface 27 and a set of magnet material elements 29, 29a, 29b having generally arcuate inner and outer surfaces 31, 31a, 31b and 33, 33a, 33b, respectively (FIG. 1). Apparatus 21 includes a set of means, such as holders 35, 35a, 35b or the like for instance, adapted for receiving magnet material elements 29, 29a, 29b, a set of cam followers 37, 37a, 37b associated with the receiving means or holders, and camming means, such as a rotatable cam plate 39 or the like for instance, adapted for selective actuation or operation and having a set of cams or cam means 41, 41a, 41b therein, respectively (FIGS. 2-5). In practicing this method, the at least one rotatable member or rotor core 25 is placed in a preselected located position in apparatus 21 with respect to holders 35, 35a, 35b, respectively, and magnet material elements 29, 29a, 29b are received in holders 35, 35a, 35b therefor (FIGS. 2, 3 and 10). The selective actuation of camming means or cam plate 39 is effected, and cams 41, 41a, 41b thereof are drivingly engaged with cam followers 37, 37a, 37b of holders 35, 35a, 35b, respectively (FIGS. 3-5). Thus, holders 35, 35a, 35b are cammed generally conjointly into assembly positions therefor with respect to rotor core 25 in its preselected located position, and arcuate inner surfaces 31, 31a, 31b of magnet material elements 29, 29a, 29b are spaced within a preselected spatial range R from circumferential surface 27 of the rotor core upon the camming of the holders into the assembly positions thereof, respectively (FIGS. 4 and 11).

More particularly and with specific reference to FIG. 1, rotor core 25 of rotatable assembly 23 includes a plurality of rotor laminations 43 which may be interconnected into a stack thereof by suitable means well known to the art, such as welding or an interlocking tab construction or the like for instance (not shown), thereby to form the rotor core having generally cylindric circumferential surface 27 thereon. An opening or bore 45 through the lamination stack of rotor core 25 may be mounted or otherwise secured about a shaft 47 by suitable means, such as for instance heat shrinking or press-fitting or the like, and the rotor core and shaft have a rotational axis 49. While rotor core 25 formed of laminations 43 is illustrated herein for purposes of disclosure, it is contemplated that various other rotor cores having various different constructions, such as for instance a solid core, a centered metal core or an edgewise strip wound core or a flux ring or the like, and mounted onto a shaft by various other methods or constructions may be utilized within the scope of the invention so as to meet at least some of the objects thereof.

In a preferred form of the invention, a preselected amount of a hardenable adhesive material 51 is applied in the illustrated beaded pattern thereof onto arcuate inner surfaces 31, 31a, 31b of magnet material elements 29, 29a, 29b prior to the disposition thereof in apparatus 21, and an activator (not shown) for the hardenable adhesive material may be applied by suitable means, such as spraying or the like for instance, onto circumferential surface 27 of rotor core 25 when it is mounted in the apparatus, as discussed in greater detail hereinafter. While hardenable adhesive material 51 and activator therefor discussed herein is Loctite 325 available from Loctite Corporation, Newington, Conn., it is contemplated that various other hardenable adhesive materials may be utilized with or without activators within the scope of the invention so as to meet at least some of the objects thereof. Furthermore, although hardenable adhesive material 51 is illustrated herein as applied in a preselected amount and in a beaded pattern onto magnet material elements 29, 29a, 29b, it is contemplated that random amounts of the hardenable adhesive material may be utilized and that the hardenable adhesive material may be applied in various other patterns or in a coat thereof onto either the magnet material elements or the circumferential surface of the rotor core or both within the scope of the invention so as to meet at least some of the objects thereof.

An end portion 53 of shaft 47 is manually placed or otherwise associated in locating engagement with a mounting device or mounting means 55 of apparatus 21, and the locating engagement of the shaft end portion with the mounting device at least generally aligns rotational axis 49 of rotor core 25 and shaft 47 with a preselected reference axis 57 of apparatus 21 defined by the mounting device, as best seen in FIG. 10. In this manner, circumferential surface 27 of rotor core 25 is disposed generally coaxially about preselected reference axis 57 in apparatus 21 and arranged generally concentrically in radially spaced relation with a set of arcuate seats or surfaces 59, 59a, 59b on holders 35, 35a, 35b when the holders are in the retracted or at-rest positions thereof, as best seen in FIGS. 2 and 3. It may be noted that the arcs or curvatures of arcuate seats 59, 59a, 59b are predeterminately arranged to define the predetermined outside diameter D of rotatable assembly 23 when holders 35, 35a, 35b are in their advanced or assembly positions locating the seats with respect to each other, as best seen in FIGS. 4 and 11 and as discussed in greater detail hereinafter.

With hardenable adhesive material 51 applied onto arcuate inner surfaces 31, 31a, 31b of magnet material elements 29, 29a, 29b, as previously discussed, the magnet material elements are manually placed or arranged in holders 35, 35a, 35b for receiving or supporting them on rotatable plate 39 when the holders are in the retracted positions thereof, as best seen in FIGS. 2, 3 and 10, respectively; however, only one of the holders and magnet material elements is illustrated in FIGS. 3-9 for purposes of drawing simplicity, the others are discussed in conjunction therewith hereinafter. Upon the placement of magnet material elements 29, 29a, 29b into holders 35, 35a, 35b therefor on cam plate 39, arcuate outer surfaces 33, 33a, 33b of the magnet material elements are disposed at least adjacent arcuate seats 59, 59a, 59b in facing or surface-to-surface engagement or relation therewith, and arcuate inner surfaces 31, 31a, 31b of the magnet material elements are disposed in facing relation with circumferential surface 27 of rotor core 25 in its preselected located position with rotational axis 49 of rotor core 25 and shaft 47 aligned with preselected axis 57 of apparatus 21, respectively. Means, such as a set of permanent magnets 61, 61a, 61b or the like for instance, are associated with holders 35, 35a, 35b for magnetic attraction or magnetic coupling relation with magnet material elements 29, 29a, 29b thereby to insure or maintain the surface-to-surface relation of arcuate outer surfaces 33, 33a, 33b on the magnet material elements with arcuate seats 59, 59a, 59b therefor on the holders, respectively; however, while the permanent magnets are illustrated herein for purposes of disclosure, it is contemplated that various other means may be associated with the holders for magnetically attracting the magnet material elements within the scope of the invention so as to meet at least some of the objects thereof. Although magnet material elements 29, 29a, 29b are disclosed herein as being manually placed into holders 35, 35a, 35b therefor, it is contemplated that various different transfer or robotic devices may be associated with apparatus 21 for automatically loading or feeding the magneic material elements into the holders therefor within the scope of the invention so as to meet at least some of the objects thereof.

Magnet material elements, 29, 29a, 29b may be formed of a frangible ferrite ceramic material and are available from Crucible Magnetics Division of Colt Industries, Elizabethtown, Ky. While magnet material elements 29, 29a, 29b are illustrated herein for purposes of disclosure, it is contemplated that various other magnet material elements of different configurations and formed of different materials may be utilized within the scope of the invention so as to meet at least some of the objects thereof. Further, in a preferred form of the invention, magnet material elements 29, 29a, 29b are not permanently magnetized until after the assembly of rotatable assembly 23 is completed. Magnet material elements 29, 29a, 29b are provided with a pair of generally radially extending opposite side or marginal edges 63, 63a, 63b and 65, 65a, 65b which are interposed between arcuate inner surfaces 31, 31a, 31b and arcuate outer surfaces 33, 33a, 33b of the magnet material elements thereby to define the arcuate lengths thereof, as best seen in FIG. 1. It may be noted that the curvature or radius of arcuate locating surfaces 59, 59a, 59b of holders 35, 35a, 35b generally correspond to those of arcuate outer surfaces 33, 33a, 33b of magnet material elements 29, 29a, 29b, and the arcuate length of the arcuate locating surfaces are predeterminately less than the arcuate length of the magnet material elements.

Figure 6:
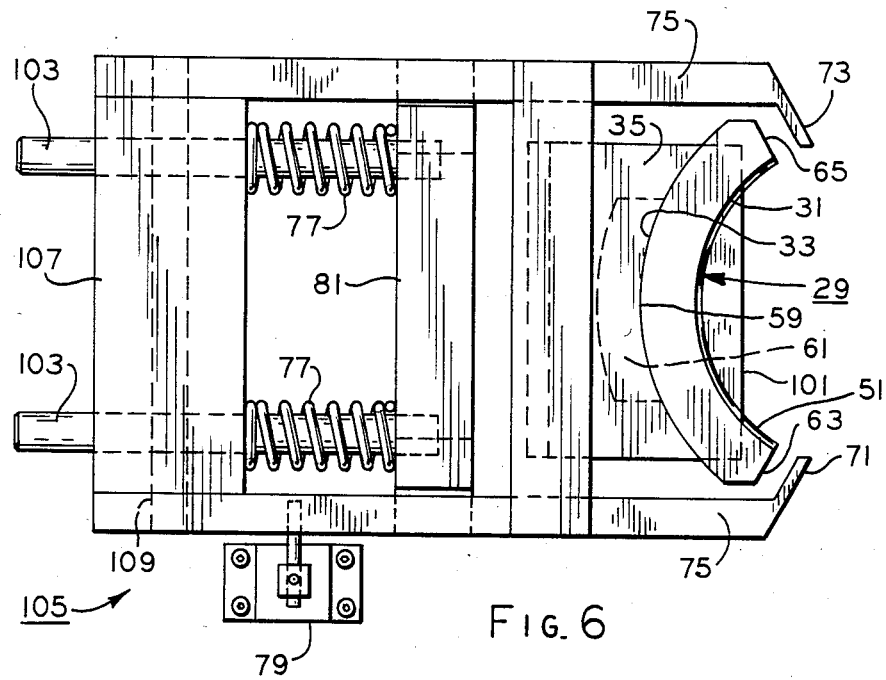
FIG. 6 is an enlarged partial plan view taken from FIG. 2 illustrating the association of the retractable clamp associated with the receiving means in the at-rest position thereof, respectively.

Upon the loading of magnet material elements 29, 29a, 29b into holders 35, 35a, 35b therefor, as discussed above, actuating means (not shown) of any suitable type known to the art operably associated with cam plate 39 may be actuated for effecting the actuation or selective rotation in one direction of the cam plate through a preselected arc or angle of rotation, as indicated by the rotational arrow in FIG. 3. When so initially rotated in the one direction, cams or cam grooves 41, 41a, 41b are drivingly engaged with cam followers 37, 37a, 37b associated with holders 35, 35a, 35b to effect their movement from the at-rest positions toward the assembly positions thereof, as best seen in FIGS. 4, 5 and 11. Of course, during this cammed movement of holders 35, 35a, 35b, a set of means, such as tracks or guides 69, 69a, 69b or the like for instance, are associated in sliding engagement with the holders for guiding them generally radially with respect to preselected reference axis 57 of apparatus 21, respectively. Upon the cam driven translation of holders 35, 35a, 35b from the at-rest positions to another or intermediate position thereof located between the at-rest and assembly positions, opposite marginal edges 63, 63a, 63b and 65, 65a, 65b of magnet material elements 29, 29a, 29b carried by the holders are urged or abutted in engagement with a set of pairs of means, such as generally opposed abutments 71, 71a, 7b and 73, 73a, 73b or the like for instance, for engagement therewith arranged on a set of pairs of opposite spaced apart jaws or jaw means 75, 75a, 75b disposed in spanning relation with the holders, respectively, as best seen in FIGS. 2 and 9. Upon the caging of opposite marginal edges 63, 63a, 63b and 65, 65a, 65b of magnet material elements 29, 29a, 29b with opposed abutments 71, 71a, 71b and 73, 73a, 73b of jaw 75, 75a, 75b, it may be noted that the jaws are conjointly movable from the at-rest positions thereof with holders 35, 35a, 35b toward the intermediate positions against the compressive force of a set of pairs of resilient means, such as springs 77, 77a, 77b or the like for instance, associated in biasing relation with the jaws, respectively, as best seen in FIGS. 2, 6 and 9. It may also be noted that in response to the aforementioned caging or engagement between the opposite marginal edges of magnet material elements 29, 29a, 29b and the opposed abutments on jaws 75, 75a, 75b at least during the conjoint movement thereof with holders 35, 35a, 35b toward the intermediate positions thereof, as shown in FIG. 9, the centers of the arcuate lengths of the magnet material elements are not only centered between the opposed abutments on the jaws but also are centered or aligned with the centers of the arcuate lengths of arcuate seating surfaces 59, 59a, 59b on the holders, respectively. Of course, when magnet material elements 29, 29a, 29b are so adjustably moved into preselected or located positions thereof on holders 35, 35a, 35b therefor, the engagements of the opposed abutments on jaws 75, 75a, 75b with the opposite marginal edges of the magnet material elements effects the movement or adjustment of arcuate outer surfaces 33, 33a, 33b on the magnet material elements generally about or circumferentially on arcuate seating surfaces 59, 59a, 59b on the holders, while the surface-to-surface relation therebetween is maintained by the magnetic coupling relation of permanent magnets 61, 61a, 61b with the magnet material elements, respectively. In this manner, magnet material elements 29, 29a, 29b are disposed in a preselected or centered position therefor with respect to holders 35, 35a, 35b, and aligned centers of the arcuate lengths of the magnet material elements and arcuate locating surfaces 59, 59a, 59b are also in radial alignment with preselected reference axis 57 of apparatus 21. It may be noted that the locating engagement between arcuate outer surfaces 33, 33a, 33b of magnet material elements 29, 29a, 29b and arcuate seats 59, 59a, 59b therefor may not be flush since the arcuate outer surface may have high points or areas thereon due to manufacturing tolerance variations in the magnet material elements; however, such locating engagements between the arcuate seats and the arcuate outer surfaces of the magnet material elements determine the effective outside diameter D of rotatable assemlby 23 which will be uniform and controlled within close tolerances, as shown in FIG. 11 and discussed in greater detail hereinafter. Further, it may also be noted that the compressive forces exerted by springs 77, 77a, 77b on jaws 75, 75a, 75b to effect the disposition of magnet material elements 29, 29a, 29b in the preselected positions thereof on holders 35, 35a, 35b therefor are relatively light being great enough to assure such locating engagement but not to cause fracture of effect cracking or chipping of the magnet material elements.

With reference to FIGS. 13A–13D and 14A–14D, assume by way of example that the arcuate lengths between opposite marginal edges 63, 63a, 63b and 65, 65a, 65b of magnet material elements 29, 29a, 29b vary within preselected tolerance limits from a maximum of 120° to a minimum of 117° thereby to have a tolerance variation of 3°. Theoretically, of course, if the arcuate length of all these magnet material elements is 120°, as indicated, the magnet material elements should occupy the entire 360° circumference of rotor 25 with the opposite marginal edges of the magnet material elements touching or engaging each other. It may be argued that the no gap situation of FIGS. 13A and 14A would ever really occur due to the tolerance variation, but the fact remains that if no means is provided to prevent such a gap distribution, then it might occur. For convenience of discussion with respect to FIGS. 13B–13D and 14B–14D, a worst case gap distribution is shown therein with the gaps being accentuated for purpose of drawing simplicity. In FIGS. 13B and 14B, if two of the magnet material elements have minimum arcuate lengths while one has a maximum arc length, then a gap of 6° may occur between magnet material elements in the FIG. 13B illustration; however, in comparison therewith, the maximum gap in the FIG. 14B illustration is only 3° with the other two gaps being 1.5°. In FIGS. 13C and 14C, if two of the magnet material elements have maximum arcuate lengths while one has a minimum arc length, then a gap of 3° may occur in the FIG. 13C illustration; however, in comparison therewith two maximum gaps of 1.5° may occur with one of the gaps being 0° in the FIG. 14C illustration. In FIGS. 13D and 14D, if all of the magnet material elements have minimum arcuate lengths of 117°, then a gap of 9° may occur between two of the magnet material elements in the FIG. 13D illustration; however, in comparison therewith, the gaps in the FIG. 14D illustration would be 3° evenly distributed between the magnet material elements. Thus, in the light of the foregoing worst case illustrations, it may be noted that when magnet material elements 29, 29a, 29b in their predetermined locations on holders 35, 35a, 35b therefor are arranged in association with circumferential surface 27 of rotor 25, as discussed hereinafter, the centering of the arcuate lengths of the magnet material elements on the holders serves to distribute more uniformly the gaps between opposite marginal edges 63, 63a, 63b and 65, 65a, 65b between the magnet material elements, respectively.

With magnet material elements 29, 29a, 29b adjustably moved to the preselected positions thereof on holders 35, 35a, 35b, as discussed above, the actuating means (not shown) for cam plate 39 may be further actuated to effect the selective rotation of the cam plate in another direction opposite the directional arrow in FIG. 3. Upon this opposite rotation of cam plate 39, cams 41, 41a, 41b thereof are again drivingly engaged with cam followers 37, 37a, 37b on holders 35, 35a, 35b to effect the return or reversal movement of the holders from the intermediate positions toward the at-rest positions thereof, and the compressive forces of springs 77, 77a, 77b effects the conjoint return or reversal movement of jaws 75, 75a, 75b from the intermediate positions toward the at-rest positions thereof with the holders, respectively, as shown in FIG. 6. At least when jaws 75, 75a, 75b are so returned to their at-rest positions, a set of means, such as double acting air or hydraulic motors 79, 79a, 79b or the like for instance, may be energized or otherwise actuated for displacing the jaws pivotally with respect to a set of means, such as supports 81, 81a, 81b or the like for instance, for supporting the jaws on apparatus 21 toward pivotally displaced positions, respectively, as shown in FIG. 8. With jaws 75, 75a, 75b so pivotally moved toward their displaced positions, opposed abutments 71, 71a, 71b and 73, 73a, 73b on the jaws are disengaged from opposite marginal edges 63, 63a, 63b and 65, 65a, 65b on magnet material elements 29, 29a, 29b which are disposed in the preselected positions thereof on holders 35, 35a, 35b with respect to arcuate seats 59, 59a, 59b thereof, respectively. With jaws 75, 75a, 75b in the displaced positions thereof, the actuating means (not shown) for cam plate 39 may be again actuated or reactuated to again effect the rotation of cam plate 39 in the direction of the directional arrow in FIG. 3, and in response to such rotation of the cam plate, cams 41, 41a, 41b thereof are again drivingly engaged with cam followers 37, 37a, 37b of holders 35, 35a, 35b to effect the generally radial movement thereof along guides 69, 69a, 69b outward the assembly positions of the holders, respectively, as best seen in FIGS. 4 and 11.

Figure 12:
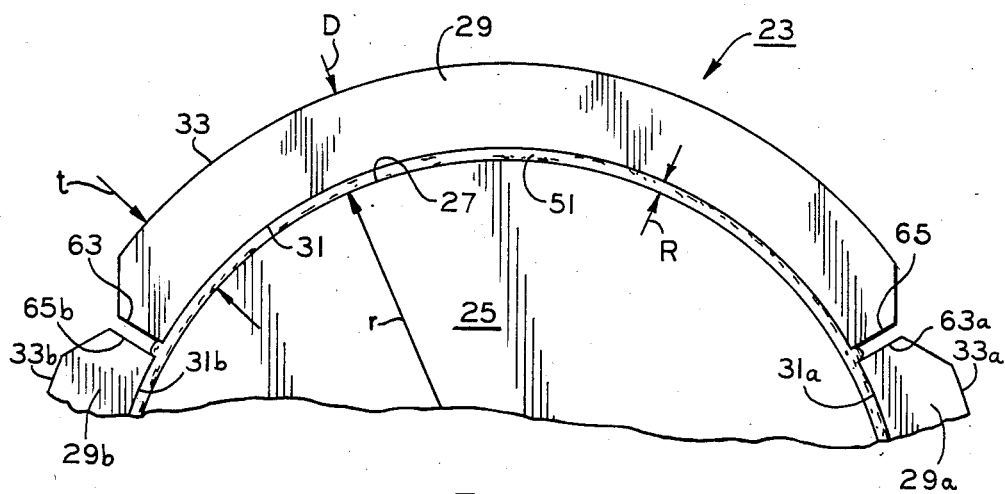
FIG. 12 is an enlarged partial view taken from FIG. 11 illustrating an arcuate inner surface of one of the magnet material elements disposed within the preselected spatial range from the circumferential surface of the rotor core with an arcuate outer surface of the magnet material element in its located position predeterminately defining a preselected outside diameter of the rotatable assembly.

Upon the cammed movement of holders 35, 35a, 35b into the advanced or assembly positions thereof, arcuate seats 59, 59a, 59b are disposed with respect to each other in positions defining the predetermined outside diameter D of rotatable assembly 13, and arcuate outer surfaces 33, 33a, 33b of magnet material elements 29, 29a, 29b are retained in the preselected positions thereof on the holders by the action of permanent magnets 61, 61a, 61b, respectively, as previously discussed. Further, the movement of holders 35, 35a, 35b into the advanced positions thereof also serves to space arcuate inner surfaces 31, 31a, 31b of magnet material elements 29, 29a, 29b within the preselected spatial range R from circumferential surface 27 of rotor core 25 in its located position with rotational axis 49 of the rotor core and shaft 47 aligned with preselected reference axis 57 of apparatus 21. Of course, arcuate inner surfaces 31, 31a, 31b of magnet material elements 29, 29a, 29b may also have high points or areas thereon due to manufacturing tolerance variations in the magnet material elements, but it may be noted that the arcuate inner surfaces of the magnet material elements are predeterminately spaced from circumferential surface 27 of rotor core 25 within the preselected spacial range R when holders 35, 35a, 35b are in the advanced positions thereof, respectively, as illustrated in FIG. 12. It has been found that when the tolerance variations between arcuate inner surfaces 31, 31a, 31b and arcuate outer surfaces 33, 33a, 33b of magnet material elements 29, 29a, 29b are at a minimum so that the magnet material elements are relatively thin, the preselected spatial range R may be from generally, about 0.002 inches to about 0.003 inches, and when the tolerance variations between the arcuate inner and outer surfaces of the magnet material elements are at a maximum so that the magnet material elements are relatively thick, then preselected spatial range R may be from generally about 0.020 inches to about 0.040 inches. While these variances in preselected spatial range R are believed to be effective in the formation of rotatable assembly 23, it is contemplated that other spatial ranges may be utilized within the scope of the invention so as to meet at least some of the objects thereof. Of course, this predetermined spacing between arcuate inner surfaces 31, 31a, 31b of magnet material elements 29, 29a, 29b and circumferential surface 27 of rotor core 25 obviates engagement therebetween to prevent fracturing, cracking or chipping of the magnet material elements and thereby compensates for the aforementioned tolerance variation in the arcs of the arcuate surfaces of the magnet material elements as well as tolerance variations which may occur in the concentricity of the circumferential surface of the rotor core.

Generally as arcuate inner surfaces 31, 31a, 31b of magnet material elements 29, 29a, 29b are brought into the facing and spaced apart relation within the preselected spatial range R with circumferential surface 27 of rotor core 25, as mentioned above, the beads of hardenable adhesive material 51 on the arcuate inner surfaces of the magnet material elements contact the circumferential surface of the rotor core, and at least a part of the hardenable adhesive matrial is thereby displaced or flowed from the beaded configuration thereof so as to at least fill the space established between the circumferential surface of the rotor core and the arcuate inner surfaces of the magnet material elements, as best seen in FIGS. 11 and 12. As previously mentioned, circumferential surface 27 of rotor core 25 may be coated with an activator for hardenable adhesive material 51, and within a predetermined period of time after the hardenable adhesive material contacts the activator therefor on the circumferential surface of the rotor core, the hardenable adhesive material will set up or harden in place in the spaces established between arcuate inner surfaces 31, 31a, 31b of magnet material elements 29, 29a, 29b and the circumferential surface of the rotor core thereby to adhere thereto the magnet material elements, as illustrated in FIG. 12. Thus, with magnet material elements 29, 29a, 29b so adhered to rotor core 25 thereby to form rotatable assembly 23, it may be noted that arcuate outer surfaces 33, 33a, 33b of the magnet material elements in the locating engagement thereof with arcuate seats 59, 59a, 59b on holders 35, 35a, 35b define the predetermined outside diameter D of the rotatable assembly and provide a generally constant outer circumferential surface therefor. Thus, regardless of the aforementioned tolerance variations of magnet material elements 29, 29a, 29b, predetermined outside diameter D of rotatable assembly 13 is constant or uniform, accurate and very closely controlled.

Upon the hardening or curing of hardenable adhesive material 51 adhering magnet material elements 29, 29a, 29b to rotor core 25 thereby to form rotatable assembly 23, as discussed hereinabove, the rotatable assembly may be removed from apparatus 21 by manually lifting or otherwise displacing the rotatable assembly from the apparatus thereby to disassociate shaft end portion 53 from mounting device 55 therefor. While the placement of rotor core 25 and shaft 47 into the located position thereof in apparatus 21 and the removal of rotatable assembly 23 from the apparatus has been disclosed herein as being effected manually, it is contemplated that such placement and removal may be effected by various different transfer or robotic equipment associated with the apparatus within the scope of the invention so as to meet at least some of the objects thereof. To complete the description of the method of operating apparatus 21 to assemble rotatable assembly 23, the actuating means (not shown) for cam plate 39 may be further operated to effect the rotation of the cam plate in the direction opposite the directional arrow in FIG. 3 thereby to again drivingly engage cams 41, 41a, 41b with cam followers 37, 37a, 37b of holders 35, 35a, 35b from the advanced positions to the retracted positions thereof, respectively, subsequent to the removal of the rotatable assembly from the apparatus. Thus, regardless of the tolerance variations in the circumferential surface 27 of rotor 25 as may be defined by radius r thereof and the tolerance variation in the thickness t of magnet material elements 29, 29a, 29b, it may be noted that the assembly method of the present invention automatically compensates for such tolerance variations so as to provide a uniform or constant outside diameter D on rotatable assembly 13, which outside diameter may be defined by the following equation:

$$D=2(t+r+R).$$

For instance, any tolerance variation in thickness t of any two of magnet material elements 29, 29a, 29b and any tolerance variation in radius r of rotor core 25 measured across any diameter or rotatable assembly 23 will be compensated for by the preselected spatial range R in which arcuate inner surfaces 31, 31a, 31b of magnet material elements 29, 29a, 29b are disposed with respect to circumferential surface 27 of the rotor core.

With reference again to the drawings in general and recapitulating at least in part with respect to the foregoing, there is shown in one form of the invention apparatus 21 for assembling rotatable assembly 23 adapted for use in a dynamoelectric machine (not shown) (FIGS. 1-11). Rotatable assembly 23 includes at least one rotatable member, such as rotor 25 for instance, having circumferential surface 27 thereon, magnet material elements 29, 29a, 29b having generally arcuate inner and outer surfaces 31, 31a, 31b and 33, 33a, 33b, respectively, and hardenable adhesive material 51 disposed on at least one of the arcuate inner surfaces of the magnet material elements and the circumferential surface of the at least one rotatable member or rotor core, respectively (FIG. 1). In apparatus 21, means, such as mounting device 53 or the like for instance, is provided for disposing rotor core 25 in a preselected position (FIG. 10). A set of means, such as holders 35, 35a, 35b or the like for instance, are movable toward assembly positions with respect to rotor core 25 in the preselected position thereof and adapted for receiving magnet material elements 29, 29a, 29b in preselected positions thereon with arcuate inner surfaces 31, 31a, 31b of the magnet material elements arranged generally in facing relation with circumferential surface 27 of the rotor core, respectively (FIGS. 2 and 3). Means, such as cam plate 39 or the like for instance, is operable generally for camming receiving means or holders 35, 35a, 35b toward their assembly positions so as to space arcuate inner surfaces 31, 31a, 31b on magnet material elements 29, 29a, 29b within the preselected spatial range R from the circumferential surface 27 of rotor core 25 in the preselected position thereof with hardenable adhesive material 51 filling at least the spaces established between the arcuate inner surfaces of the magnet material elements and the circumferential surface of the rotor core, respectively (FIGS. 3, 4, 11 and 12).

More particularly and with specific reference to FIGS. 2 and 10, apparatus 21 is provided with a base 83 on which cam plate 39 is received. A pair of generally axially aligned openings or passages 87, 89 are generally centrally provided through base 83 and cam plate 39, respectively, and mounting device 55 is received at least in opening 89. The details of base 83 as well as the details of the support and rotational association of cam plate 39 with the base are believed to be well known to the art and are omitted for purposes of drawing simplicity and brevity of disclosure.

Mounting means 55 comprises a bushing 91 predeterminately arranged or disposed in opening 89 of cam plate 39 of apparatus 21, and the centerline axis of a bore 93 of the bushing defines preselected reference axis 57 of the apparatus, as best seen in FIG. 10. Thus, when rotor core 25 and shaft 47 are disposed in the located position thereof in apparatus 21, shaft end portion 53 is received in locating engagement within bore 93 of bushing 91 thereby to align rotational axis 49 of the rotor core and shaft with preselected reference axis 57 of the apparatus. In order to locate rotor core 25 with respect to rotational plate 39 so that circumferential surface 27 of the rotor core is disposed to receive, in the aforementioned spaced apart relation magnet material elements 29, 29a, 29b carried by holders 35, 35a, 35b, respectively, an end face of the rotor core is engaged with an upper face of bushing which in effects defines an annular spacer 95 or the like, for locating the rotor core. As previously mentioned, it is contemplated that various other means, such as transfer or robotic equipment for instance, may be associated with apparatus 21 instead of mounting means 55 to maintain rotor core 25 and shaft 47 in the located position thereof in the apparatus.

As best seen in FIGS. 3-5, cams or cam grooves or slots 41, 41a, 41b provided in cam plate 39 have opposed sidewalls between which are received cam followers 37, 37a, 37b in driven engagement therewith, respectively. Cam followers 37, 37a, 37b each comprise a ball bearing 97 having its outer race slidably engaged between the aforementioned opposed sidewalls of cam grooves 41, 41a, 41b and its inner race received about a stud 99 therefor, respectively. Studs 99 extend through a set of slides 101, 101a, 101b into threaded engagement with holders 35, 35a, 35b, and the sides are reciprocally movable in sliding engagement between guides 69, 69a, 69b which are secured by suitable means to base 83 generally adjacent cam plate 39. Slides 101, 101a, 101b may be configured to provide a support or seating means for magnet material elements 29, 29a, 29b when they are disposed on holders 35, 35a, 35b therefor, and although the slides and holders are illustrated herein for purposes of disclosure as being separate pieces, it is contemplated that such slides and holders may be integral within the scope of the invention so as to meet at least some of the objects thereof. Further, it is also contemplated that cams and cam followers other than those illustrated herein for purposes of disclosure may be utilized within the scope of the invention so as to meet at least some of the objects thereof.

Figure 7:
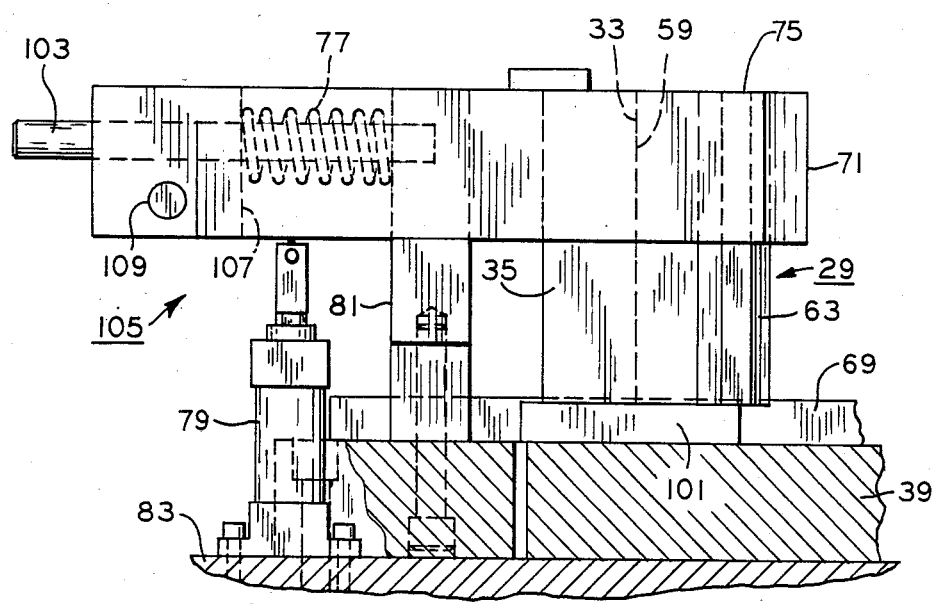
FIG. 7 is a side elevational view partially in section of the retractable clamp and receiving means of FIG. 6.

With reference to FIGS. 2 and 6-9, supports 81, 81a, 81b are also mounted by suitable means (not shown) to base 83 generally adjacent cam plate 39, and the supports include a pair of guide rods 103, 103a, 103b on which a set of retractable clamps 105, 105a, 105b are reciprocally received and on which springs 77, 77a, 77b are received in biasing engagement between the supports and the retractable clamps, respectively, as best seen in FIGS. 6-8. Retractable clamps 105, 105a, 105b include a set of pivot blocks 107, 107a, 107b to which opposite jaws 75, 75a, 75b are pivotally mounted or interconnected by a set of pivot pins 109, 109a, 109b, and the pivot blocks are slidably and guidably receivd on guide rods 103, 103a, 103b of supports 81, 81a, 81b, respectively. Springs 77, 77a, 77b on guide rods 103, 103a, 103b engage pivot blocks 107, 107a, 107b urging retractable clamps 105, 105a, 105b toward the at-rest position thereof on supports 81, 81a, 81b with respect to holders 35, 35a, 35b, and in such at-rest positions, opposed abutments 71, 71a, 71b and 73, 73a, 73b on jaws 75, 75a, 75b are arranged in spaced apart relation with opposite marginal edges 63, 63a, 63b and 65, 65a, 65b on magnet material elements 29, 29a, 29b received in holders 35, 35a, 35b therefor, as previously discussed.

In the operation of apparatus 21, assume that the component parts thereof are in the positions illustrated in FIG. 2 and that rotor core 25 and shaft 47 are in the located position thereof in the apparatus thereby to effect the alignment of rotational axis 49 of the rotor core and shaft with preselected axis 57 of the apparatus, as best seen in FIG. 10 and as previously discussed. When magnet material elements 29, 29a, 29b with hardenable adhesive material 51 applied thereto are placed in holders 35, 35a, 35b therefor in the at-rest positions thereof, the magnet material elements are supported on slides 101, 101a, 101b, and arcuate outer surfaces 33, 33a, 33b of the magnet material elements are attracted by permanent magnets 61, 61a, 61b into the surface-to-surface relation with arcuate seats 59, 59a, 59b of the holders, respectively, as best seen in FIG. 3. Further, opposed abutments 71, 71a, 71b and 73, 73a, 73b of jaws 75, 75a, 75b are disposed at least adjacent and in facing relation with opposite marginal edges 63, 63a, 63b and 65, 65a, 65b of the magnet material elements when they are received by holders 35, 35a, 35b, respectively, as best seen in FIG. 6.

The acutating means (not shown) for cam plate 39 may be initially operable to rotate cam plate 39 through its preselected arc or angle or rotation in the direction of the rotational arrow in FIG. 3, and in response to such rotation of the cam plate, cams 41, 41a, 41b thereof drive cam followers 37, 37a, 37b to move holders 35, 35a, 35b from the at-rest positions toward the intermediate positions thereof, respectively. Of course, slides 101, 101a, 101b associated with holders 35, 35a, 35b are in sliding engagement with guides 69, 69a, 69b thereby to direct the movement of the holders generally radially with respect to preselected reference axis 57 of apparatus 21. As best seen in FIGS. 6 and 9, during the movement of holders 35, 35a, 35b toward the intermediate positions thereof, opposite marginal edges 63, 63a, 63b and 65, 65a, 65b of magnet material elements 29, 29a, 29b carried on the holders are moved into engagement with opposed abutments 71, 71a, 71b and 73, 73a, 73b of jaws 75, 75a, 75b, and in response to such engagement, retractable clamps 105, 105a, 105b are conjointly movable from their at-rest positions with the holders toward the intermediate positions thereof, respectively. Upon this conjoint movement of retractable clamps 105, 105a, 105b with holders 35, 35a, 35b, pivot blocks 107, 107a, 107b are slidably moved on guide rods 103, 103a, 103b against the compressive forces of springs 77, 77a, 77b thereon, and magnet material elements 29, 29a, 29b are adjustably moved into the preselected position thereof on the holders, as discussed hereinabove. Thus, retractable clamps 105, 105a, 105b comprise a set of centering engagement means or a set of movement means, respectively.

When holders 35, 35a, 35b and retractable clamps 105, 105a, 105b are in the intermediate positions, the actuating means (not shown) for cam plate 39 is operated to effect the return rotation of cam plate 39 opposite the directional arrow in FIG. 3, and in response to such return rotation of the cam plate, cams 41, 41a, 41b thereof drive cam followers 37, 37a, 37b to return the holders from the intermediate positions toward the at-rest positions thereof. The compressive forces of springs 77, 77a, 77b biased between pivot blocks 107, 107a, 107b and supports 81, 81a, 81b of retractable clamps 105, 105a, 105b drive the pivot blocks on guide rods 103, 103a, 103b to effect the return or following movement of the retractable clamps from the intermediate positions toward the at-rest positions thereof conjointly with holders 35, 35a, 35b, respectively. Thus, when retractable clamps 105, 105a, 105b attain the at-rest positions thereof, holders 35, 35a, 35b are further movable toward their at-rest positions relative to the retractable clamps in their at-rest positions, respectively. Upon this relative movement of holders 35, 35a, 35b, opposite marginal edges 63, 63a, 63b and 65, 65a, 65b of magnet material elements 29, 29a, 29b are disengaged from opposed abutments 71, 71a, 71b and 73, 73a, 73b on jaws 75, 57a, 75b of retractable clamps 105, 105a, 105b; however, it may be noted that the magnetic attraction between permanent magnets 61, 61a, 61b on holders 35, 35a, 35b and the magnet material elements retain the magnet material elements in the preselected positions thereof on the holders.

At least upon the return of retractable clamps 105, 105a, 105b to their at-rest positions, motors 79, 79a, 79b may be actuated to retract or pivotally displace the retractable clamp toward the displaced positions thereof, as best seen in FIG. 8. Upon such movement of retractable clamps 105, 105a, 105b toward their displaced positions, jaws 75, 75a, 75b are conjointly pivoted on pivot pins 109, 109a, 109b about pivot blocks 107, 107a, 107b, and in this manner, opposed abutments 71, 71a, 71b and 73, 73a, 73b on the jaws are pivotally displaced so as to obviate further engagement thereof with opposite marginal edges 63, 63a, 63b and 65, 65a, 65b magnet material elements 29, 29a, 29b during subsequent movement of holders 35, 35a, 35b from the at-rest positions toward the assembly positions thereof, as discussed hereinafter.

With retractable clamps 105, 105a, 105b in the pivotally displaced positions thereof, the actuating means (not shown) for cam plate 39 is reactuated to effect the rotation of the cam plate through another preselected arc or angle of rotation in the direction of the directional arrow in FIG. 3, and in response to such rotation of the cam plate, cams 41, 41a, 41b thereof drive cam followers 37, 37a, 37b to move holders 35, 35a, 35b from the at-rest positions toward the assembly positions thereof, respectively, as best seen in FIG. 11. Upon this movement of holders 35, 35a, 35b into their assembly positions, magnet material elements 29, 29a, 29b carried in the preselected positions thereof on the holders are adhered by hardenable adhesive material 51 to circumferential surface 27 of rotor core 25 thereby to complete the formation of rotatable assembly 23, as previously discussed hereinabove. With magnet material elements 29, 29a, 29b s adhered to rotor core 25, rotatable assembly 23 may be removed from apparatus 21 thereby to disassociate shaft end portion 53 from bore 93 of bushing 91 and to disassociate the magnet material elements from holders 35, 35a, 35b therefor, respectively. To complete the description of the operation of apparatus 21, the actuating means (not shown) for cam plate 39 may be further actuated to effect the return rotation of the cam plate thereby to move holders 35, 35a, 35b from the assembly positions to the at-rest positions thereof.

From the foregoing, it is now apparent that a novel apparatus 21 and a novel method of operating such have been presented meeting the objects set out hereinbefore, as well as others, and it is contemplated that changes as to the precise arrangement, shapes, details and connections of the component parts utilized in such apparatus and method and also as to the precise steps and order thereof of such method may be made by those having ordinary skill in the art without departing from the spirit of the invention or from the scope of the invention as set out by the claims which follow.

What I claim as new and desire to secure by Letters Patent of the United States is:

1. A method of operating apparatus for assembling a rotatable assembly adapted for use in a dynamo-electric machine, the rotatable assembly including a rotor core having a circumferential surface and secured about a shaft therefor with the rotor core and shaft having a rotational axis, a set of magnet material elements having generally arcuate inner and outer surfaces interposed between a pair of generally opposite marginal edges defining the arcuate lengths of the magnet material elements, respectively, and a hardenable adhesive material, and the apparatus including a mounting device defining a preselected reference axis of the apparatus, a set of receiving means adapted for movement generally radially of the preselected reference axis between at-rest, intermediate and assembly positions, a set of another arcuate surfaces on the receiving means having curvatures at least generally corresponding to those of the arcuate outer surfaces of the magnet material elements and having arcuate lengths less than those of the magnet material elements, a set of cam followers associated with the receiving means, a set of permanent magnets associated with the receiving means, a set of pairs of jaws having a pair of generally opposed abutments thereon, respectively, camming means adapted for rotation, and a set of cams on the camming means, the method comprising the steps of:

applying the hardenable adhesive material onto at least one of the arcuate inner surfaces of the magnet material elements and the circumferential surface of the rotor core, respectively;

associating a part of the shaft with the mounting device and aligning thereby the rotational axis of the rotor core and shaft with the preselected reference axis of the apparatus, respectively;

disposing the magnet material elements in the receiving means in the at-rest positions thereof and positioning the arcuate outer surfaces of the magnet material elements at least generally in surface-to-surface relation with the another arcuate surfaces of the receiving means so that the arcuate inner surfaces of the magnet material elements are arranged generally in facing relation with the circumferential surface of the rotor core, respectively;

coupling magnetically the permanent magnet of the receiving means with the magnet material elements and maintaining thereby the surface-to-surface relation between the arcuate outer surfaces of the magnet material elements and the another arcuate surfaces of the receiving means, respectively;

rotating the camming means in one direction to drivingly engage the cams thereof with the cam followers of the receiving means and moving thereby the receiving means from the at-rest positions toward the intermediate positions thereof, respectively;

engaging the opposite marginal edges of the magnet material elements with the opposed abutments on the jaws upon the movement of the receiving means toward the intermediate positions thereof, respectively;

centering the arcuate lengths of the magnet material elements generally between the opposed abutments of the jaws upon the engagements thereof with the opposite marginal edges of the magnet material elements and adjusting the magnet material elements generally about the surface-to-surface relation of the arcuate outer surfaces thereof with the another arcuate surfaces of the receiving means thereby to at least generally align the centers of the arcuate lengths of the magnet material elements with the centers of the arcuate lengths of the another arcuate surfaces of the receiving means, respectively;

rotating the camming means in another direction opposite the one direction to drivingly engage the cams thereof with the cam followers of the receiving means and returning the receiving means from the intermediate positions at least in part toward the at-rest positions thereof, respectively;

disengaging the opposite marginal edges of the magnet material elements from the opposed abutments of the jaws upon the returning movement of the receiving means at least in part toward the at-rest positions thereof and actuating the jaws to positions displacing the opposed abutments thereof from the receiving means, respectively;

rerotating the camming means again in the one direction to drivingly engage the cams thereof with the cam followers upon the actuation of the jaws to effect the displacement of the opposed abutments thereof and effecting thereby the movement of the receiving means toward the assembly positions thereof, respectively;

spacing the arcuate inner surfaces of the magnet material elements on the receiving means within a preselected spatial range from the circumferential surface of the rotor core and dispersing the hardenable adhesive material on the at least one of the arcuate inner surfaces of the magnet material elements and the circumferential surface of the rotor core to at least fill the spaces established between the arcuate inner surfaces of the magnet material elements and the circumferential surface of the rotor core upon the movement of the receiving means into the assembly positions thereof, respectively; and curing the hardenable adhesive material to effect the hardening thereof.

2. The method as set forth in claim 1 wherein the apparatus further includes a set of means for centering engagement with the opposite marginal edges of the magnet material elements and wherein the effecting and adjusting step includes associating the centering engagement means with the opposite marginal edges of the magnet material elements and centering the arcuate lengths of the magnet material elements with respect to the another arcuate surfaces of the receiving means thereby to effect the adjustment of the magnet material elements into the preselected positions thereof, respectively.

3. A method of operating apparatus for assembling a rotatable assembly adapted for use in a dynamoelectric machine, the rotatable assembly including at least one rotatable member having a circumferential surface and a rotational axis, a set of magnet material elements having generally arcuate inner and outer surfaces interposed between a pair of generally opposite marginal edges defining the arcuate lengths of the magnet material elements, respectively, and a hardenable adhesive material, and the apparatus having a preselected reference axis and including a set of receiving means adapted for movement generally radially of the preselected reference axis at least between at-rest positions and assembly positions, a set of another arcuate surfaces on the receiving means, a set of cam followers associated with the receiving means, and camming means adapted for selective actuation and having a set of cam means for driving engagement with the cam followers, respectively, the method comprising the steps of:

placing the at least one rotatable member in a preselected located position with the rotational axis thereof at least generally coincidental with the preselected reference axis of the apparatus;

arranging the arcuate outer surfaces of the magnet material elements generally in surface-to-surface engagement with the another arcuate surfaces of the receiving means and facing thereby the arcuate inner surfaces of the magnet material elements generally about the circumferential surface of the at least one rotatable member in the preselected located position thereof when the receiving means are in the at-rest positions thereof, respectively;

effecting the selective actuation of the camming means to drivingly engage the cam means thereof with the cam followers thereby to initiate the movement of the receiving means from the at-rest positions toward the assembly positions thereof and adjusting the magnet material elements on the receiving means to arrange the arcuate outer surfaces of the magnet material elements in preselected positions with the another arcuate surfaces of the receiving means, respectively; and spacing the arcuate inner surfaces of the magnet material elements within a preselected spatial range from the circumferential surface of the at least one rotatable member in its preselected located position upon the movement of the receiving means into the assembly positions thereof, respectively.

4. The method as set forth in claim 3 wherein the rotatable assembly further includes a hardenable adhesive material and comprising the preliminary step of applying the hardenable adhesive material onto at least one of the arcuate inner surfaces of the magnet material elements and the circumferential surface of the at least one rotatable member, respectively.

5. The method as set forth in claim 4 wherein the spacing step includes dispersing the hardenable adhesive material on the at least one of the arcuate inner surfaces of the magnet material elements and the circumferential surface of the at least one rotatable member and filling thereby at least the spaces established between the arcuate inner surfaces of the magnet material elements and the circumferential surface of the at least one rotatable member upon the movement of the receiving means into the assembly positions thereof, respectively.

6. The method as set forth in claim 5 comprising the additional step of curing the hardenable adhesive material to effect its hardening thereby to adhere the magnet material elements to the at least one rotatable member, respectively.

7. A method of operating apparatus for assembling a rotatable assembly adapted for use in a dynamoelectric machine, the rotatable assembly including at least one rotatable member having a circumferential surface, and a set of magnet material elements having generally arcuate inner and outer surfaces, respectively, and the apparatus including a set of means adapted for receiving the magnet material elements, a set of cam followers associated with the receiving means, and camming means adapted for selective actuation and having a set of cams thereon, respectively, the method comprising the steps of:
  placing the at least one rotatable member in a preselected position with respect to the receiving means, respectively;
  receiving the magnet material elements in the receiving means and adjusting the magnet material elements into preselected positions therefor on the receiving means, respectively;
  effecting the selective actuation of the camming means and drivingly engaging thereby the cams thereof with the cam followers of the receiving means, respectively; and
  camming the receiving means generally conjointly into assembly positions therefor with respect to the at least one rotatable member in its preselected position in response to the effecting and drivingly engaging step and placing the arcuate inner surfaces of the magnet material elements in the preselected positions thereof on the receiving means within a preselected spatial range from the circumferential surface of the at least one rotatable member upon the camming of the receiving means into the assembly positions thereof, respectively.

8. The method as set forth in claim 7 wherein the receiving means include a set of another arcuate surfaces and wherein the receiving and adjusting step includes arranging the arcuate outer surfaces of the magnet material elements and the another arcuate surfaces of the receiving means generally in surface-to-surface relation with the inner arcuate surfaces of the magnet material elements arranged generally in facing relation with the circumferential surface of the at least one rotatable member, respectively.

9. The method as set forth in claim 7 comprising the preliminary step of disposing a hardenable adhesive material on at least one of the arcuate inner surfaces of the magnet material elements and the circumferential surface of the at least one rotatable member, the hardenable adhesive material filling at least the space established between the arcuate inner surfaces of the magnet material elements and the circumferential surface of the at least one rotatable member in response to the camming and placing step, respectively.

10. The method as set forth in claim 7 wherein the camming and placing step includes adjusting the magnet material elements into preselected located positions therefor on the receiving means, respectively.

11. Apparatus for assembling a rotatable assembly for a dynamoelectric machine with respect to a preselected reference axis, the rotatable assembly including a rotor core having a circumferential surface and secured about a shaft and with the rotor core and shaft having a rotational axis, a set of magnet material elements having generally arcuate inner and outer surfaces interposed between a pair of generally opposite marginal edges defining the arcuate lengths of the magnet material elements, respectively, and a hardenable adhesive material disposed on at least one of the arcuate inner surfaces of the magnet material elements and the circumferential surface of the rotor core, and the rotatable assembly also having a preselected spatial range between the circumferential surface of the rotor core and the arcuate inner surfaces of the magnet material elements, respectively, the apparatus comprising:
  a base;
  mounting means defining the preselected axis associated with said base and arranged for locating engagement with a part of the shaft so as to at least generally align the rotational axis of the rotor core and shaft with the preselected axis;
  a cam plate rotatably associated with said base and including a set of cams and an opening to accommodate the rotatable assembly when the shaft part is in the locating engagement thereof with said mounting means;
  a set of means movable generally radially with respect to the preselected reference axis between at-rest, intermediate and advanced positions and arranged for receiving the magnet material elements, respectively, said receiving means including a set of seating means for supporting said magnet material elements, a set of another arcuate surfaces arranged generally in surface-to-surface engagement with the arcuate outer surfaces of the magnet material elements so that the arcuate inner surfaces thereof are disposed generally in facing relation with the circumferential surface of the rotor core, said another arcuate surfaces each having a radius generally in radial alignment with the preselected reference axis and at least generally corresponding to that of the arcuate outer surfaces of the magnet material elements and each having an arcuate length predeterminately less than that of the magnet material elements, a set of means associated with said receiving means and operable generally for magnetically coupling with the magnet material elements to maintain the surface-to-surface engagement between the arcuate outer surfaces of the magnet material elements and said another arcuate surfaces of said receiving means, and a set of cam follower means associated with said receiving means for driven engagement with said cam means in said cam plate to effect the movement of said receiving means between the at-rest, intermediate and advanced positions thereof, respectively;
  a set of means associated with said base and extending generally in overlaying relation with said cam plate for guiding said receiving means between the at-rest, intermediate and advanced positions thereof generally radially with respect to the preselected reference axis, respectively;
  a set of means mounted with said base for centering the magnet material elements with respect to said another arcuate surfaces of said receiving means and movable both conjointly with said receiving means at least in part between the at-rest and intermediate positions thereof and pivotally with respect thereto toward a displaced position, said centering means including a set of generally opposed pairs of abutments arranged to engage the opposite marginal edges of the magnet material elements upon the movement of said receiving means from the at-rest positions toward the intermediate positions thereof, said centering means being conjointly movable with said receiving means toward the intermediate positions thereof and the outer arcuate surfaces of the magnet material elements being adjustably moved on said another arcuate surfaces of said receiving means in the surface-to-surface engagement thereof so as to align the centers of the arcuate lengths of the magnet material elements with the centers of the arcuate lengths of said another arcuate surfaces of said receiving means in response to the engagement of said opposed abutments with the opposite marginal edges of the magnet material elements, respectively; and a set of means associated with said centering means and operable generally for effecting the pivotal movement of said centering means toward the displaced position thereof so as to disengage said opposed abutments of said centering means from the opposite marginal edges of the magnet material elements subsequent to the alignment of the centers of the arcuate lengths of the magnet material elements and said another arcuate surfaces of said receiving means, respectively, said cam plate being selectively rotatable to drivingly engage said cam means thereof with said follower means of said receiving means thereby to move said receiving means between the at-rest, intermediate and advanced positions thereof, respectively, said cam plate being initially selectively rotatable to move said receiving means from the at-rest positions toward the intermediate positions thereof and subsequent to the operation of said pivotal movement effecting means said cam plate also being further selectively rotatable to move said receiving means toward the advanced positions thereof independently of said centering means in the displaced positions thereof so as to space the arcuate inner surfaces of the magnet material elements within the preselected spatial range from the circumferential surface of the rotor core with the hardenable adhesive material at least filling the space between the arcuate inner surfaces of the magnet material elements and the circumferential surface of the rotor core when said receiving means are in the advanced positions thereof, respectively.

12. The apparatus as set forth in claim 11 further comprising a set of resilient means operable generally for opposing the conjoint movement of said pivotal movement effecting means with said receiving means, respectively.

13. The apparatus as set forth in claim 11 wherein said pivotal movement effecting means each include a pivot block, a pair of spaced apart jaws spanning respective ones of said receiving means and with each jaw having a pair of opposite end portions, one of said adjacent opposite end portions of said jaws being pivotally interconnected with said pivot block and the other of said adjacent opposite ends of said jaws defining said opposed abutments, respectively, and said jaws being pivotally movable about said pivot block in response to the operation of said pivotal movement effecting means, respectively.

14. The apparatus as set forth in claim 11 further comprising a set of means mounted to said base for supporting said movement means, each supporting means including a pair of means for guiding engagement with said pivot block thereby to direct the conjoint movement of said movement means with said receiving means toward the intermediate position thereof, respectively.

15. The apparatus as set forth in claim 14 wherein said supporting means each further includes a pair of spring means disposed about said guiding engagement means and engaged with said pivot block for opposing the conjoint movement of said movement means with said receiving means toward the intermediate positions thereof, respectively.

16. Apparatus for assembling a rotatable assembly for use in a dynamoelectric machine with respect to a preselected axis of the apparatus, the rotatable assembly including a rotor core having a circumferential surface and secured about a shaft therefor with the rotor core and shaft having a rotational axis, a set of magnet material elements having generally arcuate inner and outer surfaces interposed between a pair of generally opposite marginal edges defining the arcuate lengths of the magnet material elements, and a hardenable adhesive material disposed on at least one of the arcuate inner surfaces of the magnet material elements and the circumferential surface of the rotor core, respectively, the apparatus comprising:

mounting means defining the preselected reference axis and arranged for locating engagement with a part of the shaft so as to at least generally align the rotational axis of the rotatable assembly with the preselected reference axis;

a set of means for receiving the magnet material elements and movable generally radially with respect to the preselected reference axis between at-rest and assembly positions, respectively, said receiving means including a set of another arcuate surfaces associated generally in surface-to-surface relation with the arcuate outer surfaces of the magnet material elements so that the arcuate inner surfaces thereof are arranged generally in facing relation with the circumferential surface of the rotor core when the shaft part is in the locating engagement thereof with the mounting means and when the magnet material elements are received in the receiving means, and a set of cam followers associated with said receiving means, respectively;

a set of means associated generally in sliding engagement with said receiving means for guiding said receiving means generally radially with respect to the preselected reference axis upon the movement of said receiving means between the at-rest and assembly positions thereof, respectively; and camming means selectively rotatable in one direction and another direction opposite thereto and including a set of cam means associated in driving engagement with said follower means of said receiving means and operable generally in response to the selective rotation in the one direction of said camming means for effecting the movement of said receiving means from the at-rest position toward the assembly positions thereof generally along said guiding means therefor, the arcuate inner surfaces of the magnet material elements being spaced within a preselected spatial range from the circumferential surface of the rotor core with the hardenable adhesive material at least filling the space established therebetween when said receiving means are in the assembly positions thereof, respectively.

17. Apparatus for assembling a rotatable assembly for use in a dynamoelectric machine with respect to a preselected reference axis, the rotatable assembly including at least one rotatable member having a rotational axis and a circumferential surface, a set of magnet material elements having generally arcuate inner and outer surfaces, and a hardenable adhesive material disposed on at least one of the inner arcuate surfaces of the magnet material elements and the circumferential surface of the at least one rotatable member, the apparatus comprising:

means defining the preselected axis and arranged for locating the at least one rotatable member in a located position with the rotational axis thereof at least generally in alignment with the preselected axis;

a set of means operable generally for advancing the magnet material elements toward assembly positions so as to space the arcuate inner surfaces of the magnet material elements within a preselected spatial range from the circumferential surface of the at least one rotatable member in the located position thereof and with the hardenable adhesive material at least filling the space established therebetween, respectively, and said advancing means including a set of means for engagement with the arcuate outer surfaces of the magnet material elements to arrange the arcuate outer surfaces at least generally coaxially about the preselected reference axis, respectively; and means selectively operable for effecting the operation of said advancing means and including a set of cam means for driving engagement with parts of said advancing means, respectively.

18. The apparatus as set forth in claim 17 wherein said advancing means parts comprise a set of means associated with said advancing means and operable generally for following engagement with said cam means, respectively.

19. The apparatus as set forth in claim 17 further comprising a set of means associated with said advancing means for guiding said advancing means toward the assembly positions thereof upon the selective operation of said operation effecting means, respectively.

20. The apparatus as set forth in claim 17 further comprising a set of means operable generally in association with said advancing means for adjusting the magnet material elements into preselected positions therefor on said advancing means upon the operation of the advancing means toward the assembly positions thereof, respectively.

21. The apparatus as set forth in claim 17 further comprising a set of means operable generally for magnetically retaining the magnet material elements on said advancing means, respectively.

22. Apparatus for assembling a rotatable assembly adapted for use in a dynamoelectric machine, the rotatable assembly including at least one rotatable member having a circumferential surface, a set of magnet material elements having generally arcuate inner and outer surfaces, and a hardenable adhesive material disposed on at least one of the arcuate inner surfaces of the magnet material elements and the circumferential surface of the at least one rotatable member, respectively, the apparatus comprising:

means for disposing the at least one rotatable member in a preselected position;

a set of means movable toward assembly positions with respect to the at least one rotatable member in the preselected position thereof and arranged for receiving the magnet material elements in preselected positions thereon with the arcuate inner surfaces of the magnet material elements arranged generally in facing relation with the circumferential surface of the at least one rotatable member, respectively; and means operable generally for camming said receiving means toward their assembly positions so as to space the arcuate inner surfaces of the magnet material elements within a preselected spatial range from the circumferential surface of the at least one rotatable member in the preselected position thereof with the hardenable adhesive material at least filling the space established between the arcuate inner surfaces of the magnet material elements and the circumferential surface of the at least one rotatable member, respectively.

23. The apparatus as set forth in claim 22 further comprising a set of means associated with said receiving means for guiding said receiving means toward the assembly positions thereof upon the operation of said camming means, respectively.

24. The apparatus as set forth in claim 22 wherein said receiving means include a set of means operable generally for magnetically retaining the magnet material elements in the preselected positions thereof, respectively.

25. The apparatus as set forth in claim 22 further comprising a set of means operable generally in association with said receiving means for adjusting the magnet material elements into the preselected positions thereof on said receiving means, respectively.

26. The apparatus as set forth in claim 22 wherein said camming means includes a set of cams arranged in driving engagement with parts of said receiving means to effect the movement of said receiving means generally conjointly toward the assembly positions thereof, respectively.

27. The apparatus as set forth in claim 26 wherein said receiving means parts comprise a set of cam followers associated with receiving means and disposed in driven engagement with said cams, respectively.

28. The apparatus as set forth in claim 22 wherein said receiving means include a set of another arcuate surfaces arranged generally in surface-to-surface relation with the outer arcuate surface of the magnet material elements in the preselected positions thereof on said receiving means, and the outer arcuate surfaces of the magnet material elements defining a preselected constant outside diameter of the rotatable assembly when said receiving means are in the assembly positions thereof, respectively.

* * * * *